INVENTORS
Shoji Takeda
Fujio Yamaguchi
ATTORNEYS

May 2, 1967
SHOJI TAKEDA ETAL
3,317,837
TAUT BAND SUSPENSION FOR INSTRUMENT INCLUDING
AXIAL STOP ON SUSPENSION
Filed May 15, 1963
3 Sheets-Sheet 2
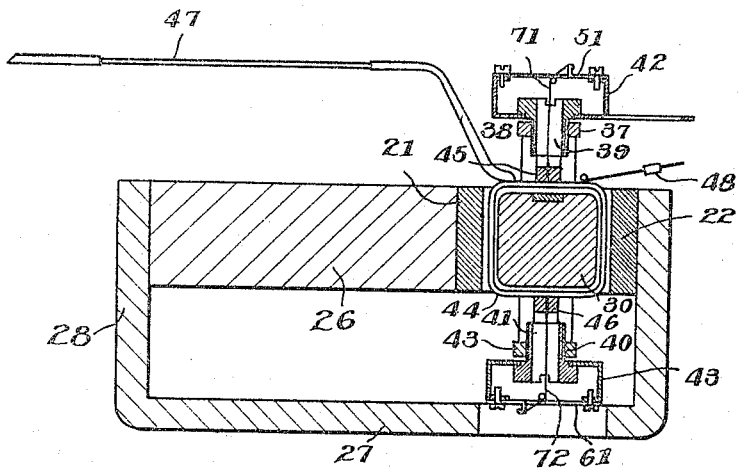
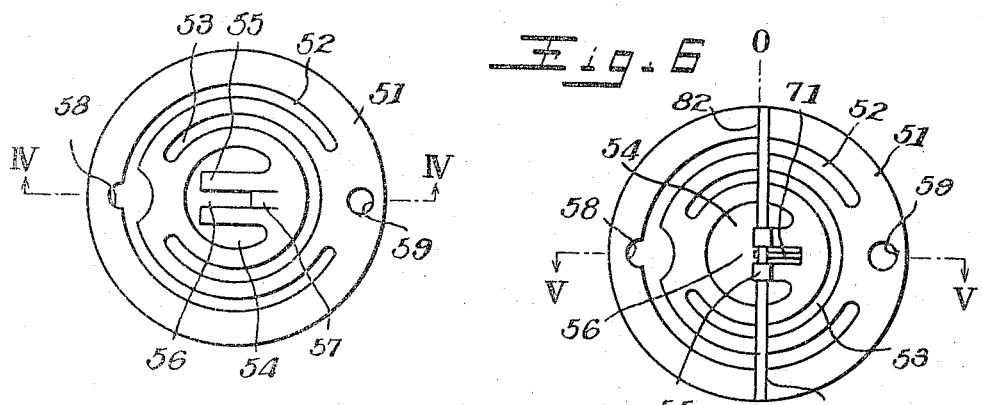
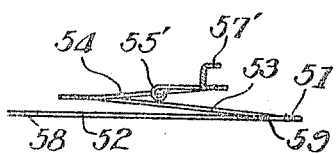
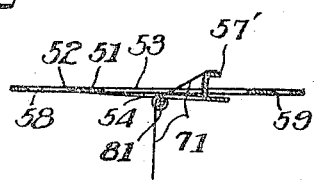
INVENTORS
Shoji Takeda
BY Fujio Yamaguchi
ATTORNEYS

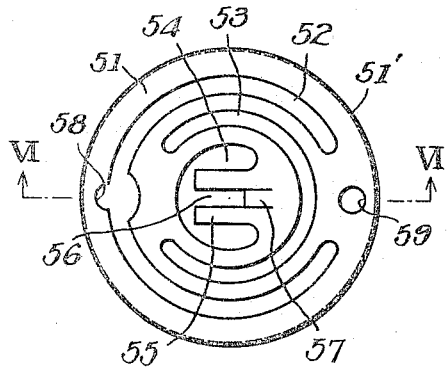
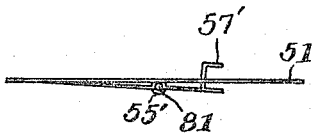
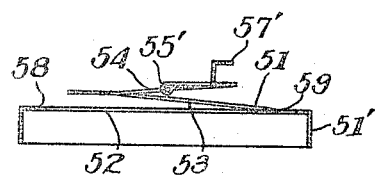
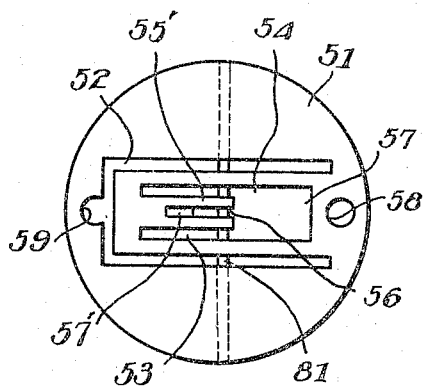
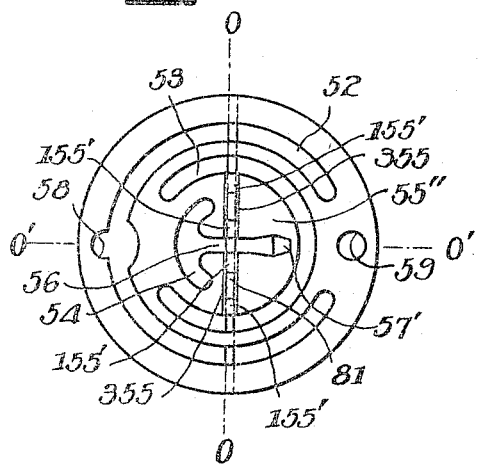
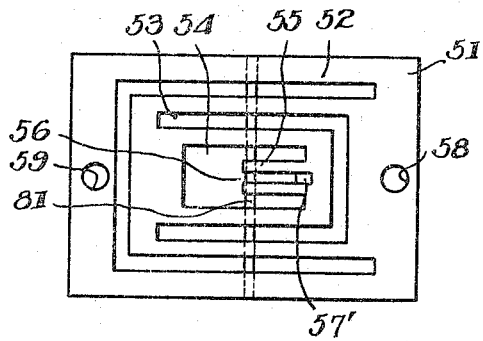

United States Patent Office 3,317,837
Patented May 2, 1967

3,317,837
TAUT BAND SUSPENSION FOR INSTRUMENT INCLUDING AXIAL STOP ON SUSPENSION
Shoji Takeda and Fujio Yamaguchi, Musashino-shi, Tokyo, Japan, assignors to Kabushikikaisha Yokogawa Denki Seisakusho (Yokogawa Electric Works Ltd.), Tokyo, Japan, a corporation of Japan
Filed May 15, 1963, Ser. No. 280,601
Claims priority, application Japan, May 29, 1962, 37/28,271
6 Claims. (Cl. 324—154)

This invention relates to a taut band suspension instrument in which the so-called instrument moving element such as a moving coil, moving iron or moving magnet is secured between tension springs by means of suspension bands.

As compared with the so-called pivot type instrument in which a rotary shaft attached to a moving element is supported by bearings, the taut band suspension instrument has many advantages such as extremely high sensitivity, long life, small power consumption etc. because there is no friction in the supporting means. In this taut band suspension instrument, however, an instrument moving element is supported by suspension bands between a pair of upper and lower corresponding tension springs, the suspension band is liable to break when the instrument is subjected to high shock conditions. That is, when the instrument is subjected to high shock conditions, not only the moving element but also the tension springs supporting it vibrate, in this case when the phases in vibration of the upper and lower tension springs are in phase it does not matter so much, but when their phases in vibration are opposite the breakage of the suspension band is caused because large tension is applied to the band by the tension springs and the moving element.

In taut band suspension instruments heretofore employed, the top of a tension spring held horizontally is folded and one end of a suspension band is fixed to the folded portion, or one end of the suspension band is secured to the center of a spiral type tension spring. However, these types of springs are formed capable of vibrating freely up and down, and hence the breakage of the suspension band is difficult to completely prevent.

One object of this invention is to provide a taut band suspension instrument in which the vibration amplitude of tension springs due to vibration and shock is reduced thereby to prevent the breakage of a suspension band.

Another object of this invention is to provide a taut band suspension instrument in which a desirable tension of a suspension band may be obtained by predetermining the bias of tension springs.

Yet another object of this invention is to provide a taut band suspension instrument in which suspension bands may be secured at correct positions.

Other objects, features and advantages of this invention will become apparent from the following description taken in connection with the accompanying drawings, in which;

FIGURE 3 is also a cross-sectional view along the line III—III in FIGURE 1;

FIGURE 4 is an enlarged plan view showing an example of a tension spring which constitutes the essential part of this invention;

FIGURE 5 is a cross-sectional view along the line IV—IV in FIGURE 4;

FIGURE 6 is a plan view illustrating a case where a stop pin and a suspension band are secured on to the tension spring of FIGURE 4;

FIGURE 7 is its cross-sectional view along the line V—V;

FIGURE 8 is a plan view showing another example of the tension spring;

FIGURE 9 is its cross-sectional view along the line VI—VI;

FIGURE 10 is a further example of the tension spring;

FIGURE 11 is its side view;

FIGURE 12 is a plan view showing another example of the tension spring; and

FIGURE 13 is a plan view illustrating a yet another example of the tension spring.

Figure 1:
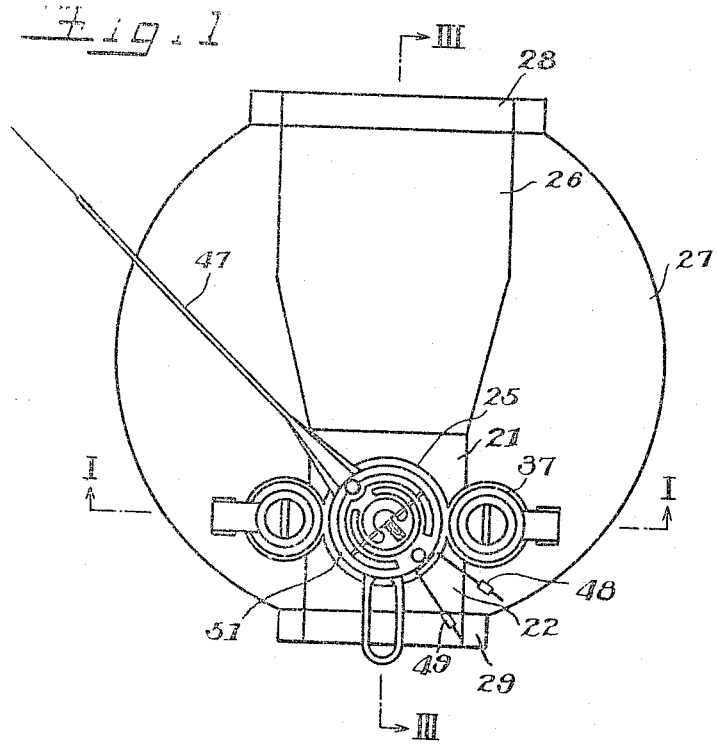
FIGURE 1 is a plan view illustrating an embodiment of an instrument of this invention.
Figure 2:
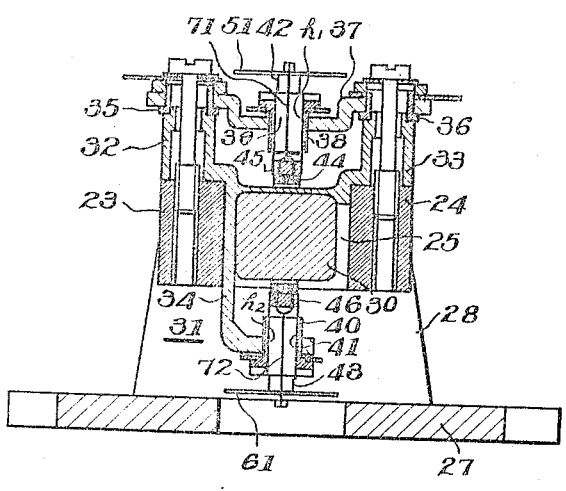
FIGURE 2 is a cross-sectional view along the line I—I in FIGURE 1.

Referring now to the drawings, FIGURES 1 through 3 are explanatory diagrams of an example of the taut band suspension instrument of this invention. The moving element, exciting element etc. of an instrument exemplified in this example merely show one of their examples, not by way of limitation.

Referring now to the drawings, 21 and 22 are pole shoes opposed across non-magnetic materials 23 and 24, in the center of which a round bore 25 is made. 26 is a permanent magnet of rectangular parallelepiped configuration, one end face of which is secured to the pole shoe 21. 27 is a yoke of U-shaped cross-section, one arm 28 of which is secured to the other end face of the permanent magnet 26, the other arm 29 being secured to the pole shoe 22. 30 is a magnetic core secured to a main frame 31 and placed in the bore 25. 37 is a bridge formed between arms 32 and 33 of the main frame through insulating bushings 35 and 36. 38 and 40 are boss stoppers which are respectively inserted into the center hole 39 of the bridge 37 and the center hole 41 of the lower parts of the main frame 34, the center holes 39 and 41 being aligned along the vertical axis.

Tension spring supporters 42 and 43 are provided respectively between the stoppers and the bridge and the lower part of the main frame. A moving coil assembly 44 is arranged in an air gap which is formed between pole shoes 21, 22 and the core 30. On the upper and lower faces are respectively provided an upper boss 45 and a lower boss 46 opposite to each other, and on the upper boss 45 are fixed a pointer 47 and balance arms 48 and 49. 51 and 61 are tension springs formed by removing some portions of a disk, which are secured to the spring supporters by screws through apertures 58 and 59. Between the two springs, there is supported the moving coil assembly 44 by suspension bands 71 and 72.

One example of the tension springs of this type is illustrated in FIGURES 4 and 5. This spring 51 is formed of a thin round resilient sheet material having circular or arc-shaped portions or slots 52, 53 and 54 removed therefrom and a recess 56 is defined in the center of a center tongue 55 which is formed by the inner slot 54 leaving one portion 57. The width of the recess 56 is substantially the same as that of a suspension band which will be described later on. Then, the remaining portion 57 of the center recess is folded upwardly to form a suspension band fitting part 57' and the tongue is folded downwardly in a cricle to form a stop pin fitting part 55'. The central portion of the spring is then formed upwardly to be cone-shaped as illustrated in FIGURE 5. In this case, by selecting suitably the height from the plane of the spring proper to the stop pin fitting part 55', a desired tension of a suspension band and the stiffness of the tension spring may be made to coincide.

As shown in FIGURES 6 and 7, the center of the tension spring is then pulled downwardly to be substantially flat to afford an upward force (bias) to the spring and a stop pin 81 is inserted to the pin fitting part 55' from underneath to be fixed at the part 55'. At this time, the position of the fitting part 55' is predetermined in such a manner that one side edge 82 of the pin 81 may substantially align with the central line O—O, in other words, the stop pin 81 is shifted by the radius thereof in one direction from the central line O—O. Thus, the stop pin is pressed on to the underside of the spring by the force of the spring and the pin fitting part 55' accordingly displaces downwardly but does not return upwardly.

FIGURES 8 and 9 illustrate another embodiment of the tension spring, in which the circumference of the spring is folded downwards to form a marginal portion 51'. With such formation of the spring, the mechanical strength of the spring proper may be increased and the positioning of the spring is easy when it is fitted to spring supporters 42 and 43.

In an example shown in FIGURES 10 and 11, stop pin fitting parts 155', 355 and 155' are projected circularly from the remaining portion 55" defined by the central slots 54, 56 and the circular slot 53 of the spring, along the axis line O—O in opposite directions each other, namely upwardly and downwardly in respect to the upper part of the spring 51 (see FIGURE 10). Stop pin fitting parts 155', 355 and 155' of the lower part of the spring 51 are equally and symmetrically formed with respect to the line O'—O'. Thus the stop pin is inserted through the stop pin fitting parts 155'-355'-155'-155'-355-155'. In this case, accordingly, the central remaining portion 55" of the spring is always under the plane of the spring proper as shown in FIGURE 11.

FIGURE 12 illustrates an example in which slots 52, 53 and 54 of rectangular configuration are made on a circular tension spring 51 and a stop pin is mounted in the center thereof. FIGURE 13 shows a case wherein the same rectangular slots as those in FIGURE 12 are formed on a tension spring of rectangular configuration. The operation and effect of these examples are substantially the same as those in the foregoing examples. In FIGURES 8 through 13, the stop pins 81 are also positioned at a place that is deviated from the central line O—O of the tension spring by the radius of the pin.

In the foregoing respective examples, although a plurality of slots 52, 53 and 54 are made in such a manner as to surround the center remaining portion 55' or 55" and this center remaining portion 55' or 55" is elastically displaced from the plane of the resilient sheet proper 51 in the vertical direction with respect to the circumference of the resilient sheet, if a single spiral slot is formed, the same elastic efforts may of course be exhibited.

In order to support a moving coil assembly 44 between the tension springs 51 and 61 formed as above described, one end of the suspension band 71 is secured to a boss of the moving coil assembly, thereafter the band is extended upwards along the outer periphery of the stop pin 81 exposed at the center slot 56 of the tongue and then the other end of the band is secured to the upward folded portion 57' of the tension spring or directly to the spring by soldering or the like, as shown in FIGURES 6 and 7, for instance. In a similar manner, the suspension band is secured between the lower tension spring and the moving coil assembly. Thus, the moving coil 44 is held at a predetermined place in an air gap formed by the pole shoes and the core. There are various means for securing the suspension band to the boss, but such means does not relate to this invention directly, so no detailed explanation thereof will be made.

In order to produce a slight gap between the tension spring 51 and the stop pin 81, it is convenient that when the suspension band is secured a thin sheet material is inserted therebetween and removed after securing the band so as to render a desirable tension to the suspension band.

In the case where a moving coil has been supported between upper and lower tension springs, even if the moving coil and the springs vibrate by being subjected to high shock conditions, the amplitude of the springs, particularly that of upward direction is extremely slight so that a force large enough to break the suspension band is not applied thereto, accordingly there is no possibility of breakage of the suspension band.

In our experiments by a "High Impact Shock Testing Machine" being designed by Method 207, MIL-STD-202B, when conventional taut band suspension instruments were dropped from the height of 1 ft. the suspension bands were completely broken. However, the suspension bands in the instruments of this invention were not ever damaged in experiments in which they were fallen from the heights of 1, 3 and 5 ft.

It will be apparent that many modifications and variations may be effected without departing from the scope of the novel concept of this invention.

What is claimed is:

1. A taut band suspension instrument comprising a tension spring proper in which a plurality of slots are made on a resilient sheet of desired configuration with all its marginal portions folded substantially vertically in such a manner as to surround the center portion of said resilient sheet and said center portion may resiliently displace in the vertical direction with respect to the plane of said resilient sheet, a pin fitting part which is provided in said center portion of said tension spring and has a recess in its center portion, a stop pin which is carried by said pin fitting part and made to be in contact with one side of said spring proper, and a suspension band which is in contact with said stop pin, one end of said band being secured to the center portion of said tension spring and the other end thereof suspending a moving element of the instrument.

2. A taut band suspension instrument comprising a tension spring proper in which a plurality of slots are made circularly on a resilient sheet of round configuration with all its marginal portions folded substantially vertically in such a manner as to surround the center portion of said resilient sheet and said center portion may resiliently displace in the vertical direction with respect to the plane of said resilient sheet, a pin fitting part which is provided in said center portion of said tension spring and has a recess in its center portion and cooperates with said tension spring, a stop pin which is carried by said pin fitting part and made to be in contact with one side of said tension spring proper, an instrument part to which said tension spring proper is secured, a moving element of the instrument to be suspended, and a suspension band, one end of said band being secured to the axis of said moving element and the other end thereof passing through the recess in the center portion formed by said pin fitting part and making contact with the circumference of said stop pin along said center line and further extending to be secured to the tension spring.

3. In a taut band suspension instrument including: a frame having an apertured wall; a movable element positioned adjacent one side of said wall and having a portion thereof in alignment with the aperture; and an elongated tension element having one end thereof secured to said movable element and the other end thereof extending through the aperture in said wall; the improvement therein comprising; a tension spring made of a resilient sheet in which a slot is formed in such a manner as to partially surround the center portion thereof so that said center portion may be resiliently displaced in a direction normal to the plane of said sheet, said spring being mounted in spaced relation to the opposite side of said wall and in substantial alignment with the aperture therein; and a stop member secured to said center portion in such a manner as to have a portion thereof overlie said sheet radially outwardly of said center portion, said tension element engaging said center portion and having its other end secured to said center portion to receive tensioned force from said tension spring; whereby said stop member is held spaced apart from the surface of said sheet radially outwardly of said center portion during normal suspension of said movable element and said stop member periodically engages the surface of said sheet radially outwardly of said center portion during periods of vibration of the instrument to prevent excessive movement of said movable element.

4. In a taut band suspension instrument according to claim 3 wherein said stop member is a pin, and further including: a pin fitting part formed by said center portion to receive said pin, said tension member engaging the surface of said pin.

5. In a taut band suspension instrument according to claim 4 wherein said tension spring has its marginal portion folded 90° with respect to the plane of said sheet.

6. In a taut band suspension instrument according to claim 4 wherein said sheet is square and said slot is U-shaped and further including a second U-shaped slot formed in said sheet such that the extended leg portions of said U-shaped slots extend in opposite directions.

References Cited by the Examiner
UNITED STATES PATENTS

| 2,562,183 | 7/1951 | Greibach | 324—154 |
| 3,111,623 | 11/1963 | Thomander | 324—154 |

WALTER L. CARLSON, *Primary Examiner.*

F. SUSKO, L. L. JOHNSON, R. V. ROLINEC,
*Assistant Examiners.*